US007144534B2

(12) United States Patent
Büchel et al.

(10) Patent No.: US 7,144,534 B2
(45) Date of Patent: Dec. 5, 2006

(54) METHOD AND DEVICE FOR PRODUCING REBONDED FOAM BLOCKS

(75) Inventors: Bodo Büchel, Königswinter (DE); Jürgen Wirth, Köln (DE); Horst Klahre, Sankt Augustin (DE)

(73) Assignee: Hennecke GmbH, Leverkusen (DE)

( * ) Notice: Subject to any disclaimer, the term of this patent is extended or adjusted under 35 U.S.C. 154(b) by 213 days.

(21) Appl. No.: 10/994,495

(22) Filed: Nov. 22, 2004

(65) Prior Publication Data

US 2005/0110183 A1   May 26, 2005

(30) Foreign Application Priority Data

Nov. 26, 2003   (DE) ................ 103 55 222

(51) Int. Cl.
*B29C 43/04* (2006.01)
(52) U.S. Cl. ............... 264/109; 264/115; 264/916; 425/383; 425/409; 425/415; 425/451.9; 425/817 R
(58) Field of Classification Search ............. None
See application file for complete search history.

(56) References Cited

U.S. PATENT DOCUMENTS 4,243,617 A * 1/1981 Burge ................ 264/39
5,292,462 A * 3/1994 Nestle ................ 264/109
6,132,655 A * 10/2000 Ray ................ 264/68
6,261,498 B1 * 7/2001 Sulzbach et al. ........... 264/120
6,358,036 B1 * 3/2002 Sulzbach et al. ........... 425/409

* cited by examiner

*Primary Examiner*—Mary Lynn Theisen
(74) *Attorney, Agent, or Firm*—Joseph C. Gil; John E. Mrozinski, Jr.

(57) ABSTRACT

The invention relates to a method of producing rebonded foam blocks in a box mould having a base, a plurality of mutually adjacent mould side walls standing thereupon and a plunger movable in the direction of the base, in which at least one of the mould side walls may be swiveled about a substantially horizontal swivel axis mounted on the base between an outwardly directed position and a substantially vertical position, the method involving mixing the foam flakes with a binder, swiveling at least one of the mould side walls outwards such that the cross-sectional area of the box mould increases from the bottom upwards, introducing the foam flakes into the box mould, adjusting the at least one mould side wall so that the cross-sectional area of the box mould is substantially constant over its height, compressing the foam flakes by means of the plunger to the desired density or foam block height, thereby bonding together the foam flakes and removing the finished foam block from the mould.

9 Claims, 4 Drawing Sheets

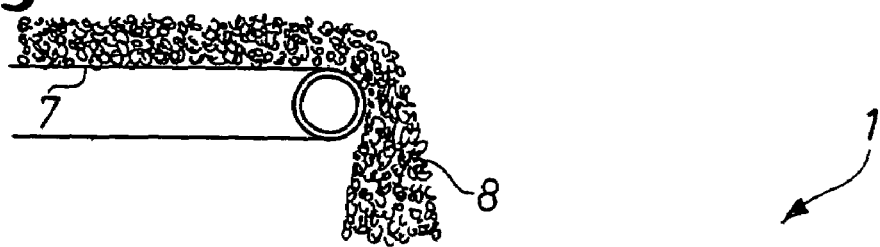
Fig.1
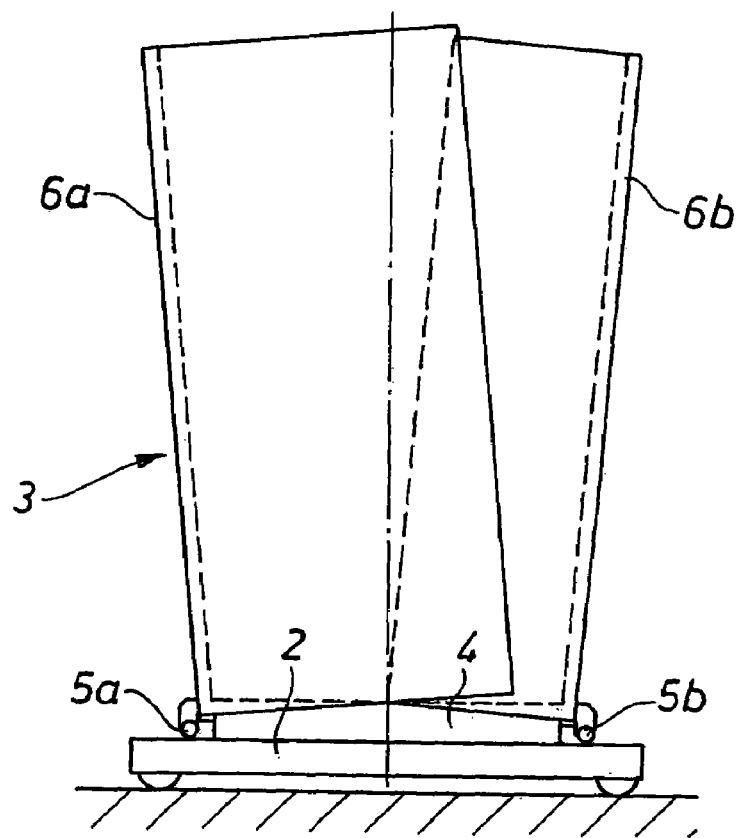
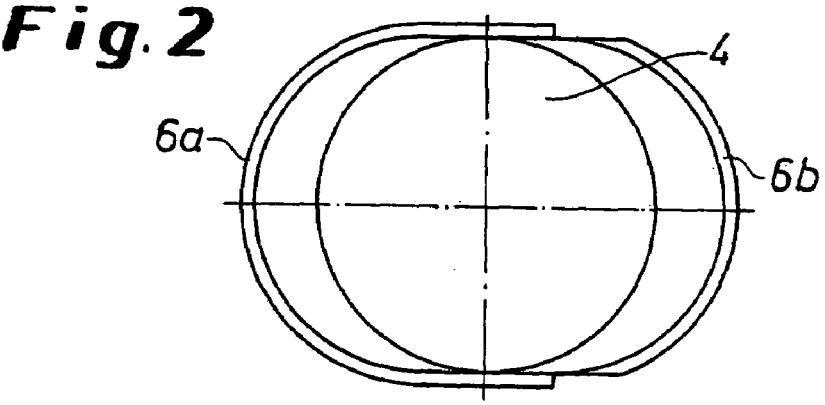
Fig.2

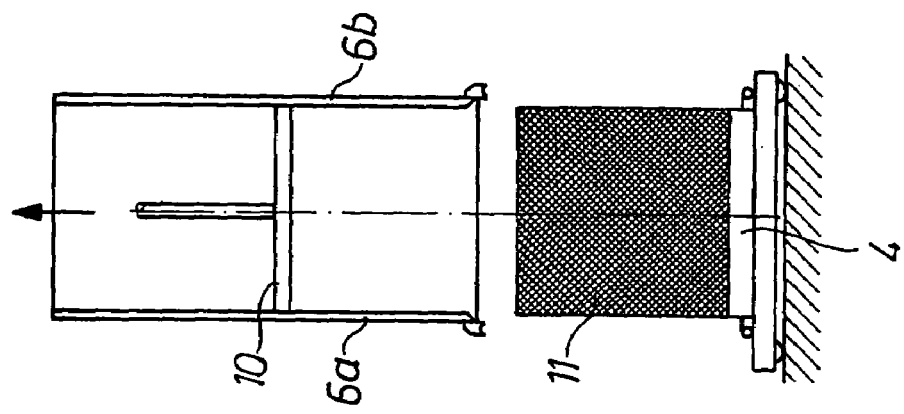
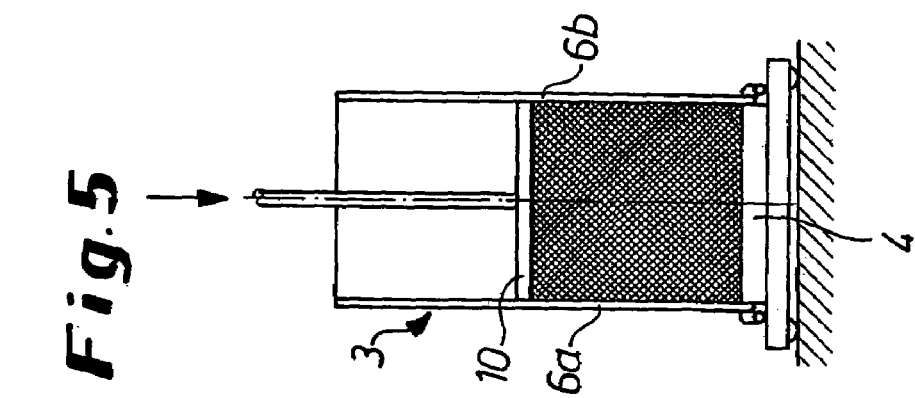
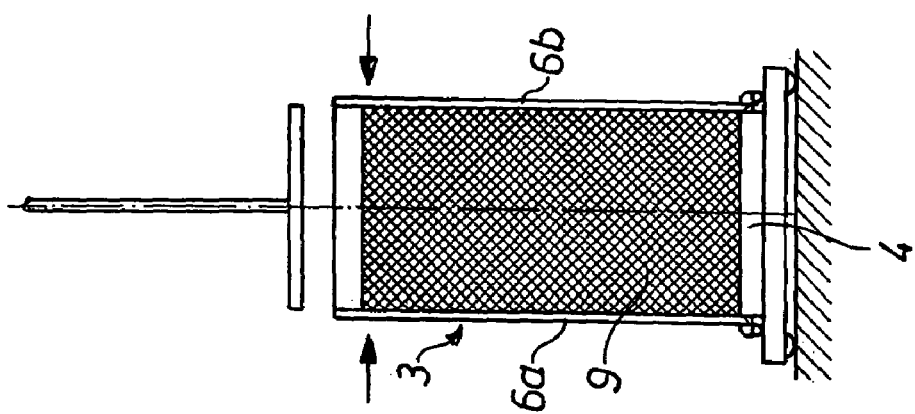
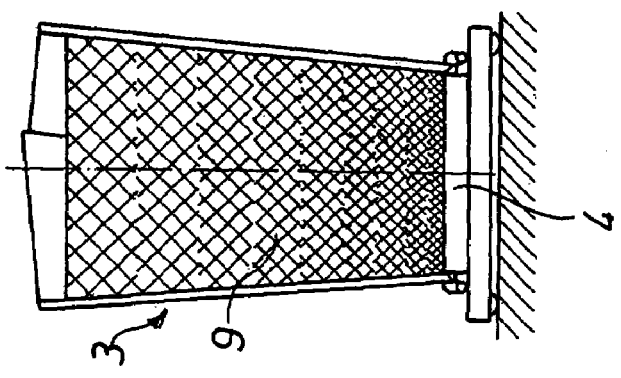

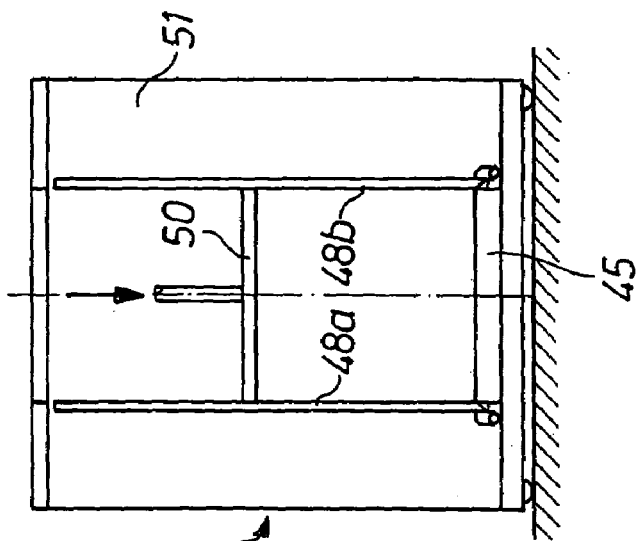
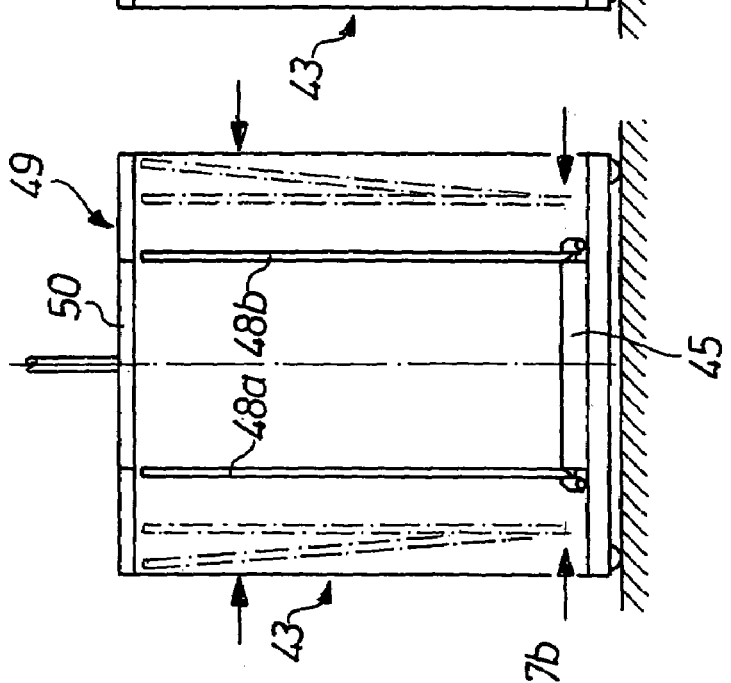
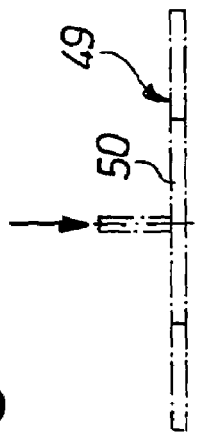

illustrates a plan view of the device of FIG. 7; and

FIGS. 9, 10 and 11 depict the sequence of steps according to the inventive method using a device with base elements movable relative to one another.

DETAILED DESCRIPTION OF THE INVENTION

The present invention will now be described for purposes of illustration and not limitation. Except in the operating examples, or where otherwise indicated, all numbers expressing quantities, percentages and so forth in the specification are to be understood as being modified in all instances by the term "about."

The present invention relates to a method of producing rebonded foam blocks in a device made from a box mould with a base and a plurality of mutually adjacent mould side walls standing thereupon and a plunger movable in the direction of the base, in which at least one of the mould side walls may be swiveled about a substantially horizontal swivel axis mounted on the base between an outwardly directed position and a substantially vertical position, the method involving mixing the foam flakes with a binder, swiveling at least one of the mould side walls outwards in such a way that the cross-sectional area of the box mould increases from the bottom upwards, introducing the foam flakes into the box mould, adjusting the at least one mould side wall so that the cross-sectional area of the box mould is substantially constant over its height, compressing the foam flakes by means of a plunger to the desired density or foam block height, thereby bonding together the foam flakes, and removing the finished foam block from the mould.

Mixing of the foam flakes with the binder may be effected for example by spraying the foam flakes with the binder. Binders which may be used are polyurethane prepolymers, adhesives or other suitable binders. Preferred prepolymers are those which consist of a polyol component, preferably a polyether polyol, and an isocyanate component, preferably tolylene diisocyanate and/or methylene diphenyl diisocyanate.

The invention is based on the theory that the cross-section of the box mould should be increased in an upwards direction when the foam flakes are introduced to compensate the difference in density in the bed arising as a result of the inherent weight of the foam flakes by different precompression over the various levels of bed.

According to the invention, this is achieved in that one or more mould side walls are adjusted to an oblique position by tilting prior to the introduction of the foam flakes. To this end, the side walls of the box mould may be mounted so as to rotate at the bottom where they are connected to the base.

To this end, the mould side walls are preferably swiveled so far outwards prior to introduction of the foam flakes that the foam flakes are compressed approximately to exactly the same degree at all levels after introduction and after swiveling back of the mould side walls into the vertical position as in the lower area of the box mould due to the inherent weight of the bed. The suitable extent of the swivel movement, i.e. the suitable tilt or swivel angle of the mould side walls, may be determined by simple tests.

The purpose of optimizing the extent of the swivel movement is generally always to achieve a homogeneous density distribution in the finished foam block. Because the foam flakes in the bed are free-flowing only to a limited degree, however, the compressive force is not always evenly distributed in all spatial directions upon compression. Therefore, an uneven distribution of the density may arise upon compression in the vertical direction in the finished foam block despite an originally homogeneous density distribu-

METHOD AND DEVICE FOR PRODUCING REBONDED FOAM BLOCKS

FIELD OF THE INVENTION

This invention relates to a method and device for producing rebonded foam blocks.

BACKGROUND OF THE INVENTION

To produce rebonded foam, polyurethane flexible foam shredded to flake size is mixed with a binder, for example a polyurethane prepolymer, introduced into a box mould and compressed to the desired density or block height. The free isocyanate groups still present in the polyurethane prepolymer react, for example, with moisture from the environment and form urea compounds. To accelerate the reaction, saturated steam may also be conveyed through the base of the box mould and through the foam block. This measure may considerably reduce the residence time or "mould dwell time" of the foam blocks in the box mould.

The box moulds used conventionally comprise a round or rectangular cross-section, which is constant over the height of the box mould.

When introducing the foam flakes into the box mould, the foam flakes are conventionally distributed manually or by a suitable device evenly over the cross-section of the box mould, in order to prevent differences in density in the horizontal direction in the finished foam block.

Because of the inherent weight of the foam flakes and the low compressive strength of the bed of foam flakes, however, there is a considerable difference in density in the bed in the vertical direction. Therefore, the bed has a markedly higher density in the lower area than in the upper area.

The result of this is that the finished foam block obtained after compression has a higher density in the lower portion than in the upper portion. This undesired effect is more noticeable the taller the box mould and thus the foam block is and the lower the density of the finished foam block is.

SUMMARY OF THE INVENTION

The present invention provides a method and a device for producing rebonded foam blocks, with which foam blocks may be obtained. The foam blocks exhibit a substantially homogeneous density distribution in the vertical direction.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein:

FIG. 1 shows a device according to the present invention for producing rebonded foam blocks;

FIG. 2 depicts a plan view of the box mould in which the mould side walls have been swiveled into the outwardly directed position;

FIGS. 3, 4, 5 and 6 depict the sequence of steps according to the inventive method;

Figure 7:
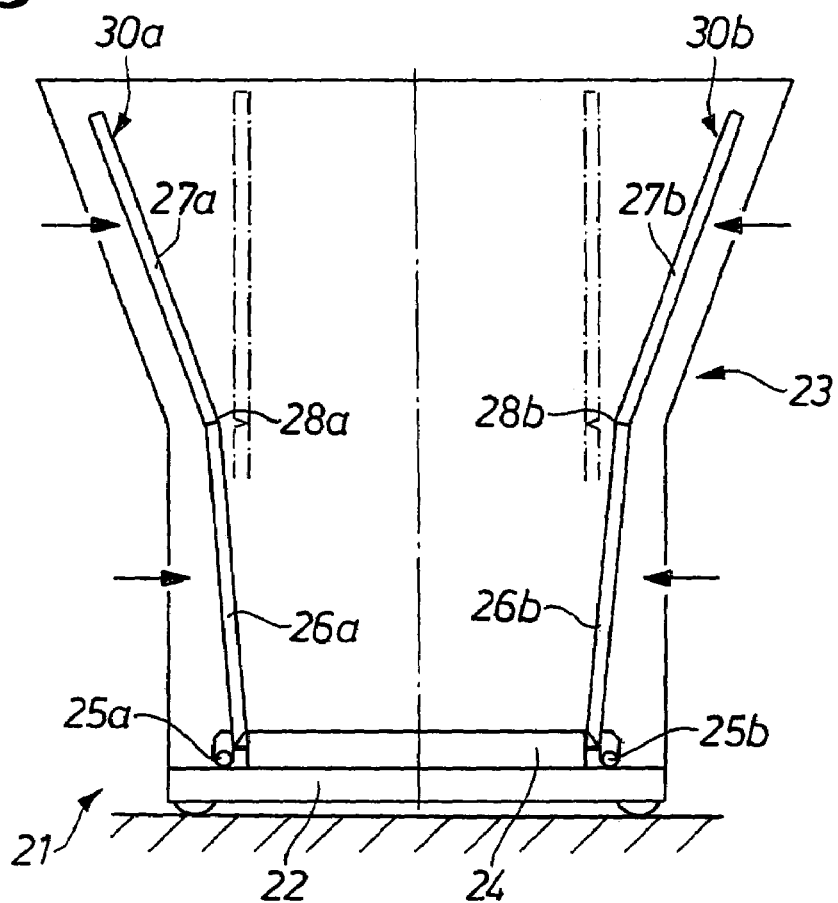
FIG. 7 shows an embodiment of the device according to the invention in which the swivelable mould side walls are subdivided into sub-segments.

tion in the bed. This effect should as far as possible be taken into account in the selection of a suitable tilt or swivel angle, for example by filling the box mould at different tilt or swivel angles during preliminary testing, then swiveling the mould side walls back into the vertical position, then compressing the bed and investigating the distribution of the density in the finished foam block.

The tilt or swivel angle is in the range of between 0.5 and 30°, more preferably between 1 and 20° and most preferably between 2 and 10°.

In principle, however, it is also possible to use the method according to the invention to achieve any desired density profiles over the height of the finished foam block.

In an embodiment of the method according to the invention, the at least one mould side wall is subdivided into at least two sub-segments arranged one above the other, wherein each of the sub-segments may be swiveled about a substantially horizontal swivel axis, and wherein the bottommost sub-segment may be swiveled between an outwardly directed position and a substantially vertical position and wherein the remaining sub-segments may be swiveled between an outwardly directed position and a vertical position. Prior to introduction of the foam flakes, all the sub-segments are swiveled outwards in such a way that the cross-sectional area of the box mould increases from the bottom upwards and all the sub-segments are inclined at different angles relative to the horizontal.

In this way, it is possible to ensure that non-linear density gradients over the filling height may also be compensated after swiveling the side elements into the vertical position.

In another embodiment of the method according to the invention, the base consists of at least two base elements movable horizontally relative to one another and preferably engaging at least partially in one another. Prior to introduction of the foam flakes into the box mould, the base elements are moved apart, such that the cross-sectional area of the base increases. After introduction of the foam flakes into the box mould, the base elements are then moved back together.

In this way, the structural height of the entire compression device may be minimized.

The invention also relates to a device for producing rebonded foam blocks, made from a box mould with a base and a plurality of mutually adjacent mould side walls standing thereon and a plunger movable in the direction of the base, wherein at least one of the mould side walls may be swiveled about a substantially horizontal swivel axis mounted on the base between an outwardly directed position and a substantially vertical position.

The substantially horizontal swivel axis is preferably horizontal. The substantially vertical position is preferably vertical. However, the invention also covers devices in which the swivel axis or the vertical position deviates slightly, for example by an angle of up to 20°, preferably by an angle of less than 10°, from the horizontal or vertical.

The box mould preferably has a round, oval or rectangular cross-section. Other cross-sectional shapes are likewise possible, however.

In another embodiment, the swivelable mould side walls may be swiveled by means of a hydraulic device.

In another embodiment, the swivelable mould side walls are subdivided into at least two sub-segments arranged one above the other, wherein each of the sub-segments may be swiveled about a substantially horizontal swivel axis, wherein the bottommost sub-segment may be swiveled between an outwardly directed position and a substantially vertical position and wherein the remaining sub-segments may be swiveled between an outwardly directed position and a vertical position. In the position parallel with the bottommost sub-segment, all the sub-segments then lie in a common, preferably vertical plane.

In another embodiment, the base consists of at least two base elements movable horizontally relative to one another and preferably engaging at least partially in one another. The base elements may engage telescopically in one another, for example, and be displaceable relative to one another.

FIGS. 3 to 6 show the method according to the invention sequentially from filling of the box mould to removal of the foam block from the mould.

FIG. 1 shows a device 1 according to the invention for producing rebonded foam blocks, comprising a transport carriage 2, on which a box mould 3 is arranged. The box mould 3 has a base 4, to which there are attached swivel axes 5a and 5b, by means of which the mould side walls 6a and 6b may be swiveled from the vertical position into an outwardly directed position. In FIG. 1, a box mould is shown in which the mould side walls 6a and 6b have been swiveled into the outwardly directed position.

The foam flakes 8 mixed with the binder are conveyed into the box mould 3, by means of a conveying device 7 which is arranged above the box mould 3, until the desired filling level is reached.

FIG. 2 depicts a plan view of the box mould 3 in which the mould side walls 6a and 6b have been swiveled into the outwardly directed position. Before the beginning of filling, the base 4 is not as yet covered with foam flakes.

FIG. 3 shows the box mould 3 after filling with the foam flakes. Owing to the inherent weight of the foam flakes, the density of the foam flakes in the bed 9 decreases as the distance from the base 4 increases. This is illustrated pictorially in FIG. 3 by shading which decreases in density towards the top.

FIG. 4 shows the box mould 3 after the mould side walls 6a and 6b have been swiveled back into the vertical position, such that a box mould cross-section is achieved which is constant over the height thereof. The swivel movement of the mould side walls 6a, 6b is symbolized by the two arrows. By swiveling the mould side walls 6a, 6b into the vertical position, the foam flakes in the bed 9 are compressed, wherein the foam flakes are the more heavily compressed the greater their distance from the base 4.

FIG. 5 shows the box mould after the plunger 10 has been introduced into the box mould 3 in the vertical direction and has compressed the bed to the desired block height or the desired density to obtain a foam block.

At the end of the mould dwell time, the finished foam block 11 is removed from the mould by withdrawing the plunger 10 and the mould side walls 6a, 6b so far in an upward direction that the foam block 11 lies freely on the base 4 and may be removed. This is shown in FIG. 6. Alternatively, however, after the plunger has been withdrawn upwards, the mould side walls may also be tilted outwards, for example.

FIG. 7 shows a particular embodiment of the device 21 according to the invention, comprising a transport carriage 22, on which a box mould 23 is arranged. The box mould itself has a base 24, to which there are attached swivel axes 25a and 25b. The two mutually facing mould side walls 30a, 30b illustrated in FIG. 7 are each subdivided into a lower sub-segment 26a, 26b and an upper sub-segment 27a, 27b.

The two lower sub-segments 26a, 26b stand on the horizontal swivel axes 25a, 25b and are connected detachably thereto by retaining devices. The top edges of the lower sub-segments 26a, 26b are connected with the bottom edges of the upper sub-segments 27a, 27b by means of horizontal swivel axes 28a, 28b of articulated form.

In the illustration shown in FIG. 7, both the lower sub-segments 26a, 26b and the upper sub-segments 27a, 27b are swiveled into the outwardly directed position. The upper sub-segments 27a, 27b are tilted into a more oblique position than the lower sub-segments 26a, 26b, to compensate for uneven compression during subsequent compression established in preliminary tests. As indicated by the arrows, the sub-segments 26a, 26b, 27a, 27b are swiveled back into the vertical position (indicated by the broken lines) after filling of the box mould 23 with foam flakes.

Figure 8:
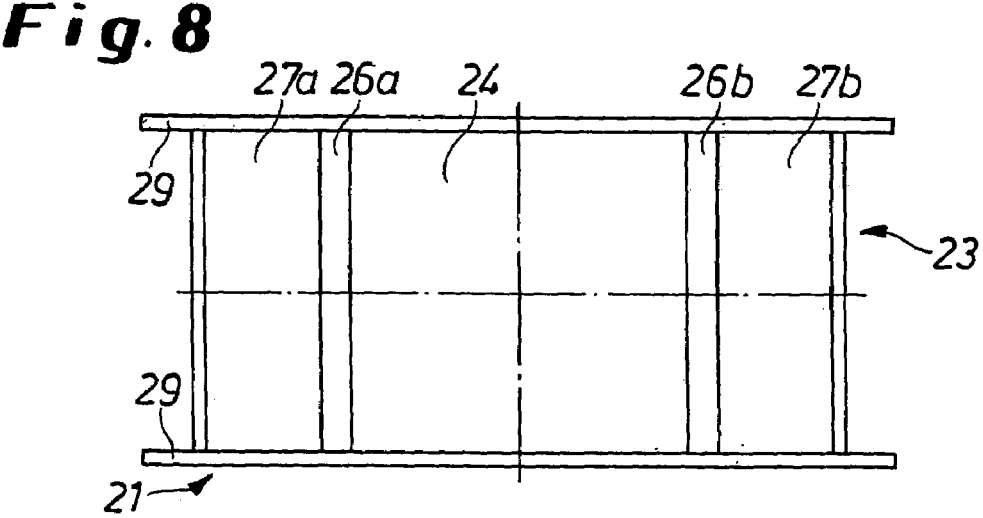

FIG. 8 provides a plan view of the box mould 23 illustrated in FIG. 7, having a base 24, swivelable mould side walls with the lower sub-segments 26a, 26b upper sub-segments 27a, 27b and two stationary mould side walls 29.

FIG. 9 shows an embodiment of the device 41 according to the invention having a transport carriage 42, on which a box mould 43 is arranged. The box mould 43 has a base 44, which has a central, partially hollow base plate 45 and two telescopically displaceable base elements 46a, 46b which may be partially retracted into the central base plate 45. Horizontal swivel axes 47a, 47b are in each case attached to the outwardly directed ends of the retractable base elements 46a and 46b, by which swivel axes 47a, 47b the mould side walls 48a, 48b may be swiveled from the vertical position into the outwardly directed position. The box mould is additionally provided with a vertically displaceable mould cover 49, into which is incorporated plunger 50 for compressing the foam flakes.

As illustrated in FIG. 9, the two retractable base elements 46a and 46b have been extended from the central base plate 45 and the mould side walls 48a and 48b have been swiveled into the outwardly directed oblique position. The box mould 43 is ready to be filled with the foam flakes provided with binders. After filling, the mould cover 49 is lowered and positioned on the box mould 43.

After filling of the box mould 43 with the foam flakes and positioning of the mould cover 49, the mould side walls 48a and 48b are swiveled back into the vertical position, as shown in FIG. 10, and the two retractable base elements 46a and 46b (no longer visible in FIG. 10) are retracted into the central base plate 45, such that the box mould assumes a cross-section which is smaller overall than during the filling process and constant over the height of the box mould 43. The box mould 43 is then ready for compression of the foam flakes.

Compression is effected by lowering the plunger 50 to the desired height of the foam block or until the desired density is reached. The foam flakes are enclosed during this process between the central base plate 45 and the plunger 50, the mould side walls 48a, 48b in the vertical position and the two stationary side walls 51. Before removal from the mould, the foam block has to reside long enough in the box mould 43 for a firm bond to be achieved between the foam flakes and the binder.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of producing rebonded foam blocks in a box mould comprising a base, a plurality of mutually adjacent mould side walls standing thereupon and a plunger movable in the direction of the base, wherein at least one of the mould side walls is swivelable about a substantially horizontal swivel axis mounted on the base between an outwardly directed position and a substantially vertical position, the method comprising:
  mixing foam flakes with a binder;
  swiveling at least one of the mould side walls outwards such that a cross-sectional area of the box mould increases from the bottom upwards;
  introducing foam flakes into the box mould;
  adjusting the at least one mould side wall so that the cross-sectional area of the box mould is substantially constant over its height;
  compressing the foam flakes by means of the plunger to a desired density or foam block height, thereby bonding together the foam flakes; and
  removing the finished foam block from the mould.

2. The method according to claim 1, in which the at least one mould side wall is subdivided into at least two sub-segments arranged above each other, wherein each of the sub-segments may be swiveled about a substantially horizontal swivel axis, wherein the bottommost sub-segment may be swiveled between an outwardly directed position and a substantially vertical position and wherein the remaining sub-segment(s) may be swiveled between an outwardly directed position and a vertical position, in which, prior to introduction of the foam flakes, all the sub-segments are swiveled outwards such that the cross-sectional area of the box mould increases from the bottom upwards and all the sub-segments are inclined at different angles relative to the horizontal.

3. The method according to claim 1, in which the base comprises at least two base elements movable horizontally relative to one another and engaging at least partially in one another, and in which, prior to introduction of the foam flakes into the box mould, the base elements are moved apart, such that the cross-sectional area of the base increases and, after introduction of the foam flakes into the box mould, the base elements are moved back together.

4. A device for producing rebonded foam blocks, comprising a box mould comprising a base and a plurality of mutually adjacent mould side walls standing thereupon and a plunger movable in the direction of the base wherein at least one of the mould side walls may be swiveled about a substantially horizontal swivel axis mounted on the base between an outwardly directed position and a substantially vertical position.

5. The device according to claim 4, wherein the at least one mould side wall is subdivided into at least two sub-segments arranged one above the other, wherein each of the sub-segments is swivelable about a substantially horizontal swivel axis, wherein the bottommost sub-segment is swivelable between an outwardly directed position and a substantially vertical position and wherein the remaining sub-segments may be swiveled between an outwardly directed position and a vertical position.

6. The device according to claim 4, wherein the base comprises at least two base elements movable horizontally relative to one another and engaging at least partially in one another.

7. The method according to claim 1, wherein the at least one of the mould side walls outwards is swiveled at an angle in the range of between about 0.5 and about 30°.

8. The method according to claim 1, wherein the at least one of the mould side walls outwards is swiveled at an angle in the range of between 1 and 20°.

9. The method according to claim 1, wherein the at least one of the mould side walls outwards is swiveled at an angle in the range of between 2 and 10°.

* * * * *